(12) United States Patent
Nakano (10) Patent No.: US 6,219,391 B1
(45) Date of Patent: Apr. 17, 2001

(54) WIRELESS COMMUNICATION APPARATUS AND WIRELESS COMMUNICATION METHOD

(75) Inventor: Takayuki Nakano, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/078,327

(22) Filed: May 14, 1998

(30) Foreign Application Priority Data

Aug. 20, 1997 (JP) .................................................... 9-238951

(51) Int. Cl.[7] .............................. H03D 1/04; H03D 1/06; H03K 6/04; H03K 5/01; H04B 1/10
(52) U.S. Cl. ............................................ 375/346; 375/148
(58) Field of Search ..................................... 375/346, 348, 375/350, 325, 340, 285, 224, 227, 130, 140, 148, 147; 455/226.1, 67.3, 67.1, 63; 370/491, 500, 526

(56) References Cited

U.S. PATENT DOCUMENTS

| | | | |
|---|---|---|---|
| 4,146,838 | * | 3/1979 | Takada . |
| 4,901,307 | | 2/1990 | Gilhousen et al. . |
| 4,962,507 | | 10/1990 | Renshaw . |
| 5,031,194 | * | 7/1991 | Crespo et al. . |
| 5,109,390 | | 4/1992 | Gilhousen et al. . |
| 5,574,748 | * | 11/1996 | Vander Mey et al. ................ 375/140 |
| 5,586,148 | * | 12/1996 | Furukawa et al. .................... 375/340 |
| 5,694,388 | | 12/1997 | Sawahashi et al. . |
| 5,712,877 | * | 1/1998 | Ho et al. ............................... 375/284 |
| 5,760,629 | * | 6/1998 | Urabe et al. .......................... 327/307 |
| 5,799,047 | * | 8/1998 | Dobrica ................................. 375/350 |

FOREIGN PATENT DOCUMENTS

| | | |
|---|---|---|
| 716520 | 6/1996 | (EP) . |
| 8-88589 | 4/1996 | (JP) . |

* cited by examiner

Primary Examiner—Don N. Vo
Assistant Examiner—Jean B. Corrielus
(74) Attorney, Agent, or Firm—Greenblum & Bernstein, P.L.C.

(57) ABSTRACT

Waveform estimating section 302 observes the amplitude and phase of pilot signals outputted from pilot despreading section 301, and estimates the amplitude, frequency and phase of the pilot signals having no interference. Sine wave generating section 303 generates pilot signals of sine wave of the estimated amplitude, frequency and phase. Coherent detecting section 305 corrects the phase shift of data signals outputted from data channel despreading section 304, using the generated pilot signals.

5 Claims, 7 Drawing Sheets

WIRELESS COMMUNICATION APPARATUS AND WIRELESS COMMUNICATION METHOD

BACKGROUND OF THE INVENTION

1. Field of the Invention

The present invention relates to a CDMA system wireless communication apparatus and wireless communication method, in which demodulation is carried out by a pilot coherent detection.

2. Related Art

Recently, in the Cellular system such as automobile telephones and portable telephones, etc., an effective utilization technique of frequencies which is capable of securing a capacity of a number of subscribers on limited frequency bands has become important.

A code division multiple access (CDMA) system has been noted as one of multiple access systems which is able to effectively utilize frequencies. The CDMA system is also called "Spread Spectrum Multiple Access (SSMA) system", which is able to achieve excellent communication quality by a wide band feature and a correlational property by codes of pseudorandom noise (PN), etc.

A land mobile communication system in which the CDMA system is employed, is disclosed in, for example, U.S. Pat. No. 4,901,307. As one of the CDMA systems, there is a direct spread system in which pseudorandom noise codes (hereinafter called "spread code") are multiplied onto transmission signals.

In a case where the direct spread system is employed, it is possible to increase a diversity effect by receiving in rake and synthesizing the multi-path components in the maximum ratio. Rake receiving is disclosed in, for example, U.S. Pat. No. 5,109,390.

Figure 1:
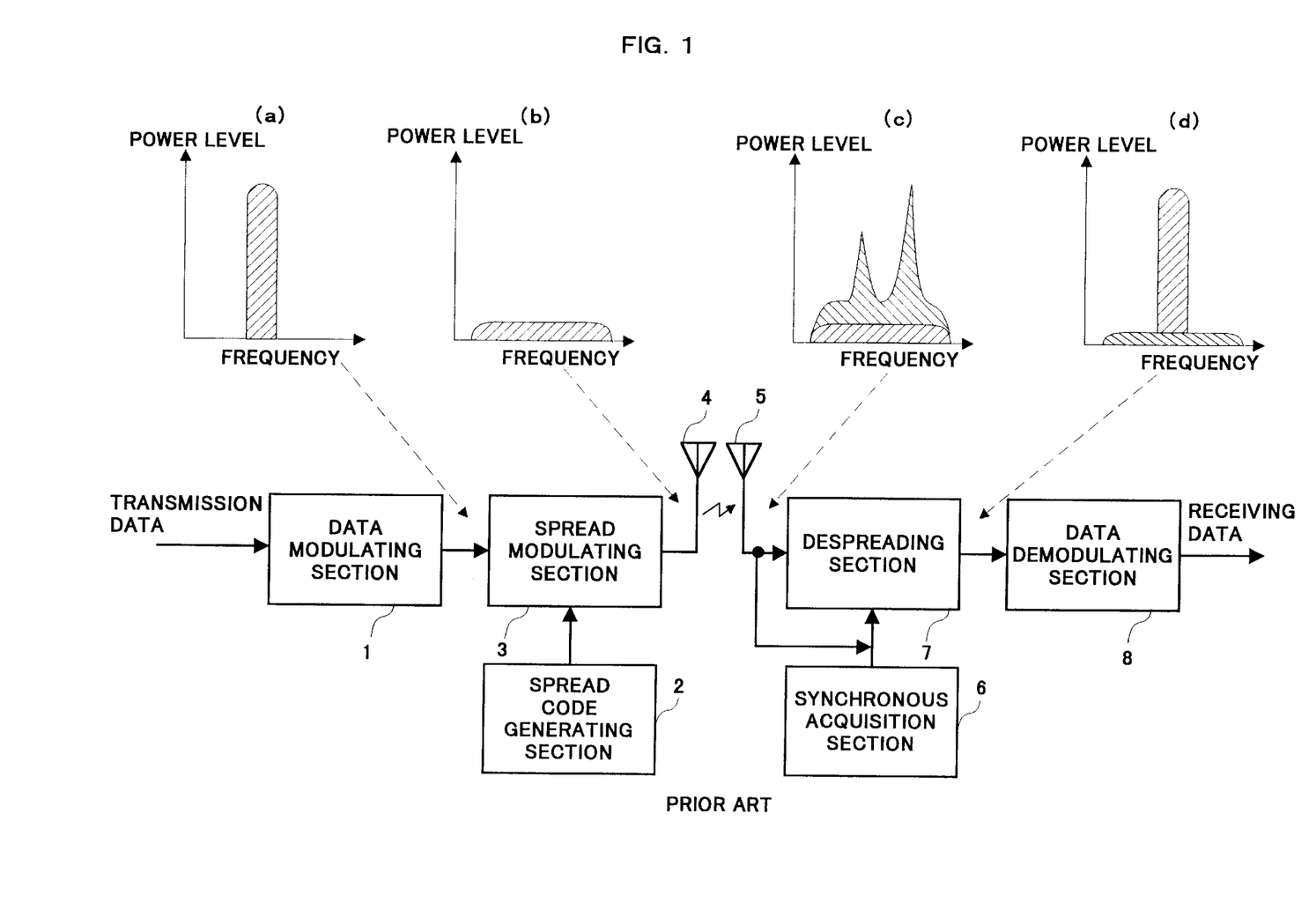
FIG. 1 is a block diagram showing a construction of CDMA wireless communication system using a direct spread system.

Hereinafter, a description is given of the outline of CDMA wireless communication system in which the direct spread system is employed, with reference to FIG. 1. FIG. 1 is a block diagram showing the configuration of CDMA wireless communication system using the direct spread system.

As shown in FIG. 1, the transmission side of CDMA wireless communication system is mainly composed of a data modulating section 1 for modulating the transmission data, a spread code generating section 2 for generating spread codes, a spread modulating section 3 for multiplying spread codes onto transmission signals, and a transmission antenna 4 for wirelessly transmitting transmission signals.

Furthermore, the receiving side of the same system is mainly composed of a receiving antenna 5 for receiving signals wirelessly transmitted from the transmission side, a synchronous acquisition section 6 for generating spread codes at the same timing as that of those generated by the spread code generating section 2, a despreading section 7 for multiplying spread codes onto receiving signals, and a data demodulating section 8 for demodulating despread receiving signals.

In a CDMA wireless communication system constructed as described above, transmission data such as voice data is modulated by the data modulating section 1, and the modulated signals are narrow-band signals having only a band width necessary for transmission as shown at (a).

Furthermore, the band width of spread codes generated by the spread code generating section 2 is sufficiently wide in comparison with the band width of signals modulated by the data modulating section 1 as shown at (b).

The signals modulated by the data modulating section 1 are transmitted by the transmission antenna 4 with the spread codes thereof multiplied by the spread modulating section 3.

Signals received by the receiving antenna 5 are multiplied again by the despreading section 7 with spread codes generated by the synchronous acquisition section 6 and are despread from a wide band to a narrow band.

Interference resulting from other users and thermal noise, etc. are caused to add on the transmitted signals in the process to the receiving side as shown at (c). However, since spread codes have sufficiently small correlation with the interference, the interference are reduced by the despreading section 7 as shown at (d) to cause the received data to be detected.

Here, in the CDMA wireless communication system such as a down link of Cellular system, etc., there is such a type where pilot signals which are already known to each user are always or periodically transmitted through a pilot channel using the pilot channel along with a data channel for transmitting data with respect to the users.

At the receiving side of the CDMA wireless communication system, using signals (hereinafter called "pilot signals") transmitted through the pilot channel, several processes such as synchronous acquisition, tracking, estimation of multi-path condition, coherent detection, frequency synchronization, hand-off, etc. are carried out. Of them, coherent detection process of signals (hereinafter called "data signals") transmitted from the data channel using the pilot signals is called "pilot coherent detection".

Hereinafter, a description is given of the pilot coherent detection in a conventional wireless communication apparatus, with reference to a block diagram shown in FIG. 2. Furthermore, FIG. 2 corresponds to the synchronous acquisition section 6 and the despreading section 7 of FIG. 1.

Figure 2:
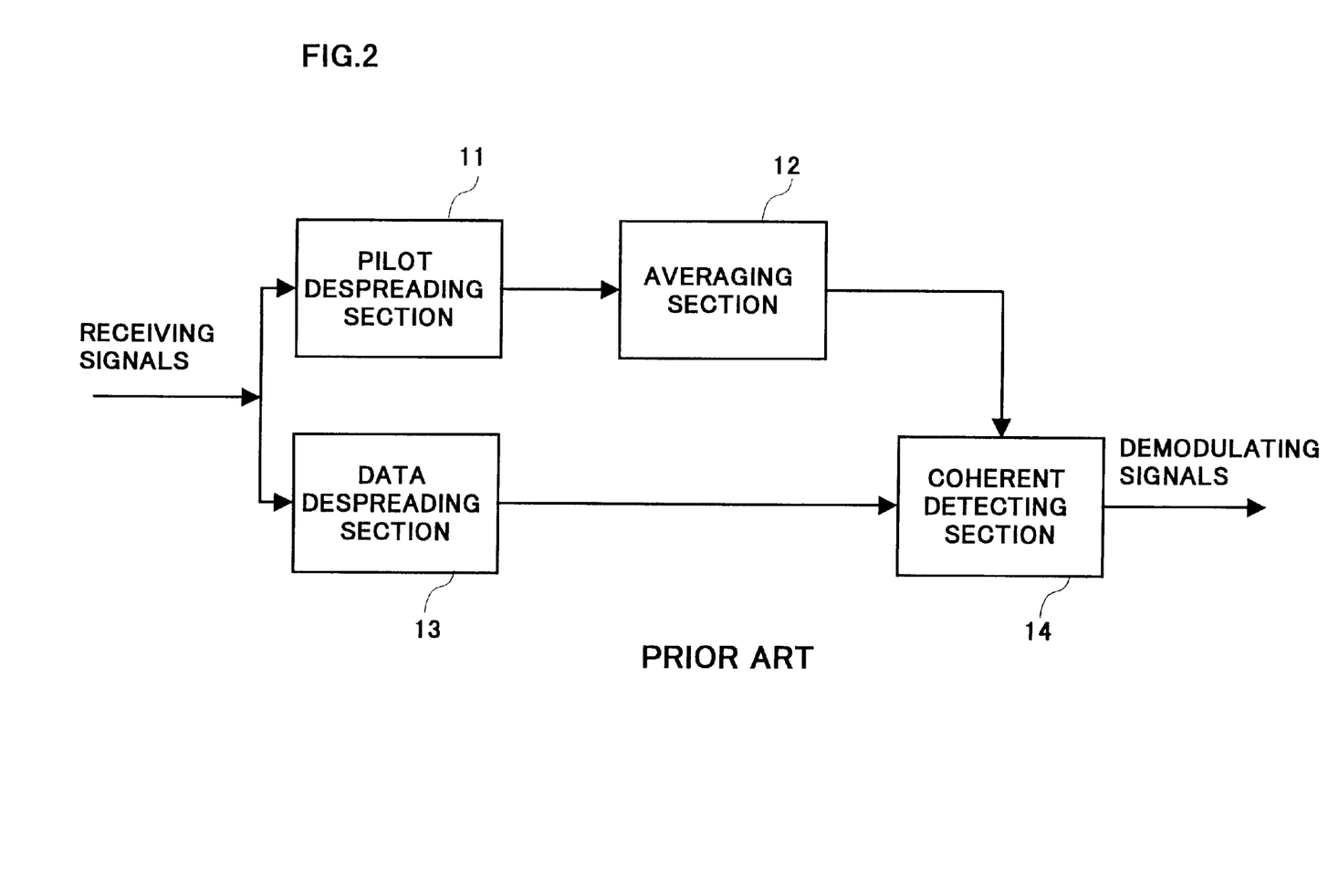
FIG. 2 is a block diagram showing a construction of the conventional wireless communication apparatus.

As shown in FIG. 2, the conventional wireless communication apparatus despreads receiving signals using pilot spread codes, and the apparatus is mainly composed of a pilot despreading section 11 for detecting pilot signals, an averaging section 12 for averaging the detected pilot signals as described later, a data despreading section 13 for despreading the received signals using spread codes for data and for detecting the data signals, and a coherent detecting section 14 for correcting the phase shift of data signals using the averaged pilot signals.

With regard to signals received by the wireless communication apparatus constructed as described above, pilot signals are detected by being despread with spread codes for pilot at the pilot despreading section 11 and data signals are detected by being despread with spread codes for data at the data despreading section 13.

The detected pilot signals are averaged by the averaging section 12, wherein the phase shift of the data signals is corrected by the coherent detecting section 14 on the basis of the averaged pilot signals.

Next, a description is given of the averaging of pilot signals, wherein it is assumed that the spread is carried out by quadrature phase shift keying system (QPSK system).

Pilot signals outputted from the pilot despreading section 11 are expressed by formula 1 shown below;

$$I_0(t) = A_0 \cdot \cos \phi(t) + n_0'(t)$$
$$Q_0(t) = A_0 \cdot \sin \phi(t) + n_0^Q(t) \qquad \text{Formula 1}$$

where $A_0$ shows the level of pilot signals, $\phi(t)$ shows a carrier phase offset, and $n_0'(t)$, $n_0^Q(t)$ show interference. The interference includes interference of other multi-path waves, interference of channels other than the pilot channel, and interference of other cells., etc.

Pilot signals are averaged by the averaging section 12 in the period of time for which the values of cos φ(t), sin φ(t), etc. are regarded to be constant. By this averaging, the interference are decreased, the level $A_0$, and values of cos φ(t) and sin φ(t) of the pilot signals are obtained. Furthermore, the data signals outputted from the data despreading section 13 for user k are expressed by formula 2 described below;

$$I_k(t)=A_k \cdot d_k(t) \cdot \cos \phi(t)+n_k^I(t)$$

$$Q_k(t)=A_k \cdot d_k(t) \cdot \sin \phi(t)+n_k^Q(t) \quad \text{Formula 2}$$

$A_k$ indicates the level of spread code of user k, $d_k(t)$ indicates the data of user k, and $n_k^I(t)$, $n_k^Q(t)$ indicates interference.

If it is assumed that there is no interference in the pilot signals and data signals after averaging, that is, if it is assumed that interference $n_0^I(t)$, $n_0^Q(t)$, $n_k^I(t)$, $n_k^Q(t)$ in formulas 1 and 2 are zero (0), the carrier phase offset is corrected by an inner product calculation at the coherent detecting section 14, wherein demodulation signals expressed by the following formula 3 can be obtained.

$$I_0(t) \cdot I_k(t)+Q_0(t) \cdot Q_k(t)=A_0 \cdot A_k \cdot d_k(t) \quad \text{Formula 3}$$

Herein, in wireless lines such as mobile communications, the level $A_0$ of pilot signals and phase offset φ(t) change in line with movement of a mobile station, a frequency shift occurs due to fading in addition to carrier frequency offset of a local oscillator at the receiving side.

However, the abovementioned conventional wireless communication apparatus is not able to correct the phase shift of date signals unless the cycle of averaging is in the period of time for which the value of cos φ(t) and sin φ(t) of formula 1 can be regard to be constant.

Since the cycle of averaging needs much shorter than the carrier frequency offset or the frequency shift due to fading, the abovementioned conventional wireless communication apparatus is not able to sufficiently decrease the interference added onto the received signals in a case where the carrier frequency offset or the frequency shift occurs due to fading. As result, the demodulation signals are deteriorated after pilot coherent detection is performed, and the receiving quality is lowered.

SUMMARY OF THE INVENTION

The first object of the invention is to provide a wireless communication apparatus and a wireless communication method, which are able to prevent the demodulation signals from being deteriorated after the pilot coherent detection is performed and to attempt to improve the receiving quality.

The invention is able to achieve the abovementioned object by lowering the interference added on despread pilot signals and by carrying out pilot coherent detection using pilot signals decreased the interference.

DESCRIPTION OF THE PREFERRED EMBODIMENTS

A description is given of preferred embodiments of the invention with reference to the invention.
(Embodiment 1)

The first embodiment is an embodiment for estimating pilot signals, in which interference are lowered from despread pilot signals, using estimation coefficients.

Figure 3:
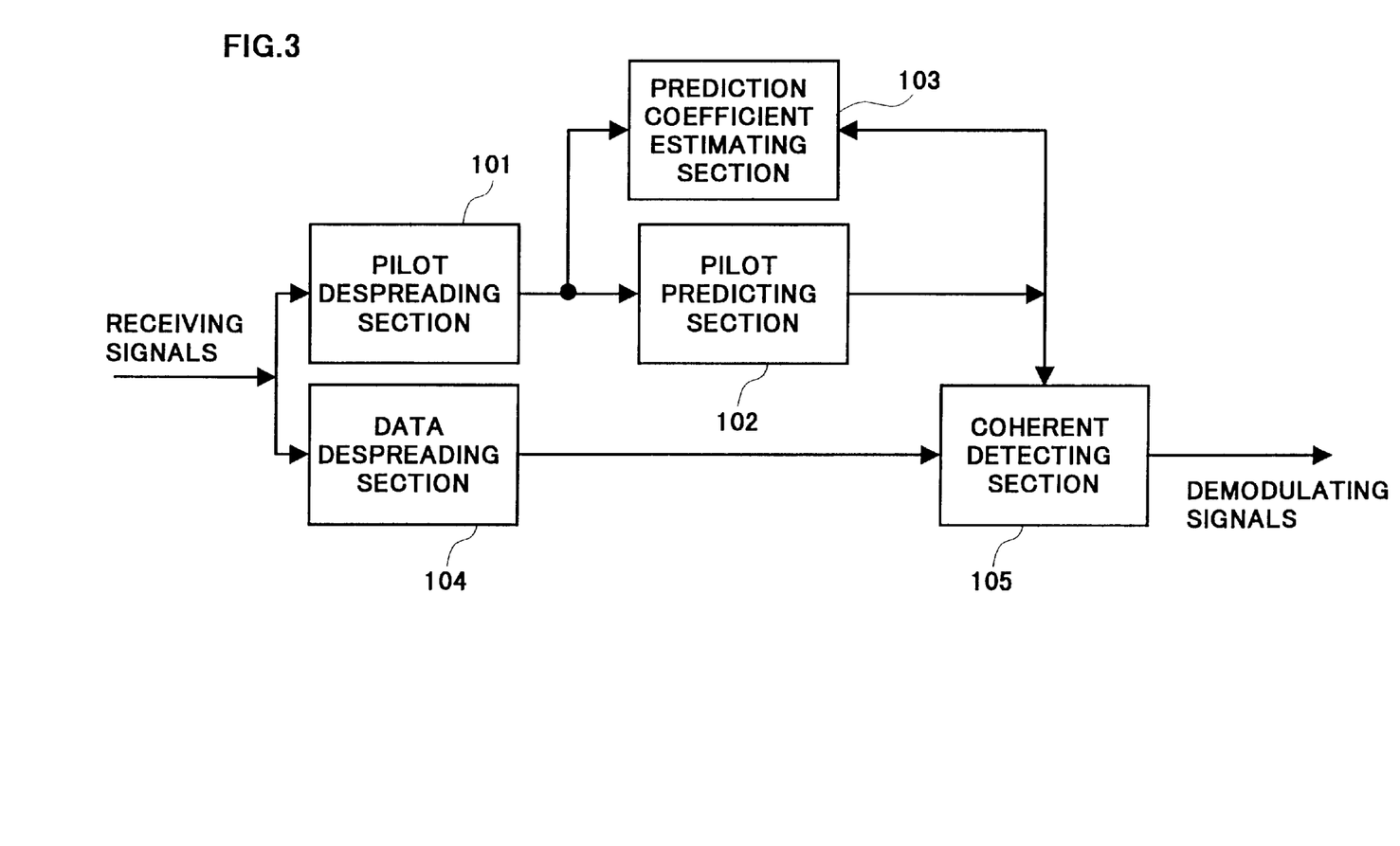
FIG. 3 is a block diagram showing a construction of a wireless communication apparatus according to a first embodiment of the invention.

FIG. 3 is a block diagram showing a construction of a wireless communication apparatus according to the first preferred embodiment.

In the wireless communication apparatus of FIG. 3, pilot despreading section 101 despreads received signals using spread codes for pilot channel and detects signals (hereinafter called "pilot signals") transmitted through the pilot channel. Pilot estimation section 102 estimates pilot signals, in which interference are decreased from pilot signals (hereinafter called "despread pilot signals") despread by pilot despreading section 101, using estimation coefficients, as described later. Estimation coefficient prediction section 103 estimates an estimation coefficient so that the error between the despread pilot signals and pilot signals (hereinafter called "estimation pilot signals") estimated by the pilot estimation section 102 is minimized, and the estimation coefficient prediction section 103 outputs the estimation coefficient to pilot estimation section 102.

Data despreading section 104 despreads signals (hereinafter called "data signals") transmitted through the data channel, using spread codes for data channel. Coherent detecting section 105 corrects the phase shift of data signals (hereinafter called "despread data signals") despread, using estimation pilot signals.

Signals received by the wireless communication apparatus constructed as described above are despread by pilot despreading section 101 with spread codes for pilot channel, wherein despread pilot signals are detected and despread by data despreading section 104 with spread codes for data channel, and despread data signals are detected.

Despread pilot signals and estimation coefficients estimated by estimation coefficient prediction section 103 are calculated by pilot estimation section 102, wherein estimation pilot signals decreased any interference are outputted.

Furthermore, coherent detecting section 105 corrects the phase shift of the despread data signals on the basis of the estimation pilot signals.

Next, a description is given of the estimation of pilot signals in the first embodiment. Since interference n(t) is caused to add onto pilot signal x(t) before wireless transmission, in despread pilot signal y(t), it can be expressed by the following formula 4.

$$y(t)=x(t)+n(t) \quad \text{Formula 4}$$

Pilot estimation section 102 constitutes a filter so that the evaluation function J shown in the following formula 5 is minimized, and by causing despread pilot signals to pass through the filter, the pilot estimation section 102 outputs estimation pilot signals, the interference of which are decreased.

$$J=E[(x(t+m)-x(t+m)^2] \qquad \text{Formula 5}$$

where x'(t) indicates estimation pilot signals, E[−] indicates the average, and (t+m) indicates the time lag (m) from the time (t).

A problem of designing a filter so that the evaluation function J is minimized is called the "Wiener problem". Various kinds of solving means have been known. For example, a product of the Wiener-Hopf equation may be used for this minimizing, and an adaptive algorism may be employed. The estimation coefficient prediction section 103 is to achieve these solving means.

As one example of estimation pilot signals, a case where it is expressed by a linear coupling of pilot signals from the present to the Nth sample in the past is shown in the following formula 6.

$$x'(n+1) = \sum_{k=0}^{N-1} a_k \cdot y(n-k) \qquad \text{Formula 6}$$

where $a_k$ indicates a weighing coefficient, x'(n) is a sampling value at the time nT (T: sampling interval, and n: integer), and N indicates a duration of observation.

Thus, estimation pilot signals can be obtained by multiplying the respective sampling values up to the present by a weighing coefficient. The weighing coefficient is selected by the estimation coefficient prediction section 103, so that the error between the despread pilot signals and estimation pilot signals is minimized.

Thus, by constituting a filter using estimation coefficients, causing the despread pilot signals to pass through the filter and estimating pilot signals, the interference of which are decreased, it is possible to prevent the demodulation signals from being deteriorated after pilot coherent detection is carried out, and to attempt to improve the receiving quality after the pilot coherent detection is carried out.

(Embodiment 2)

The second embodiment is an embodiment in which a time constant of filtering is determined by estimating a carrier frequency offset value from the despread pilot signals, and interference are decreased by filtering the despread pilot signals.

Figure 4:
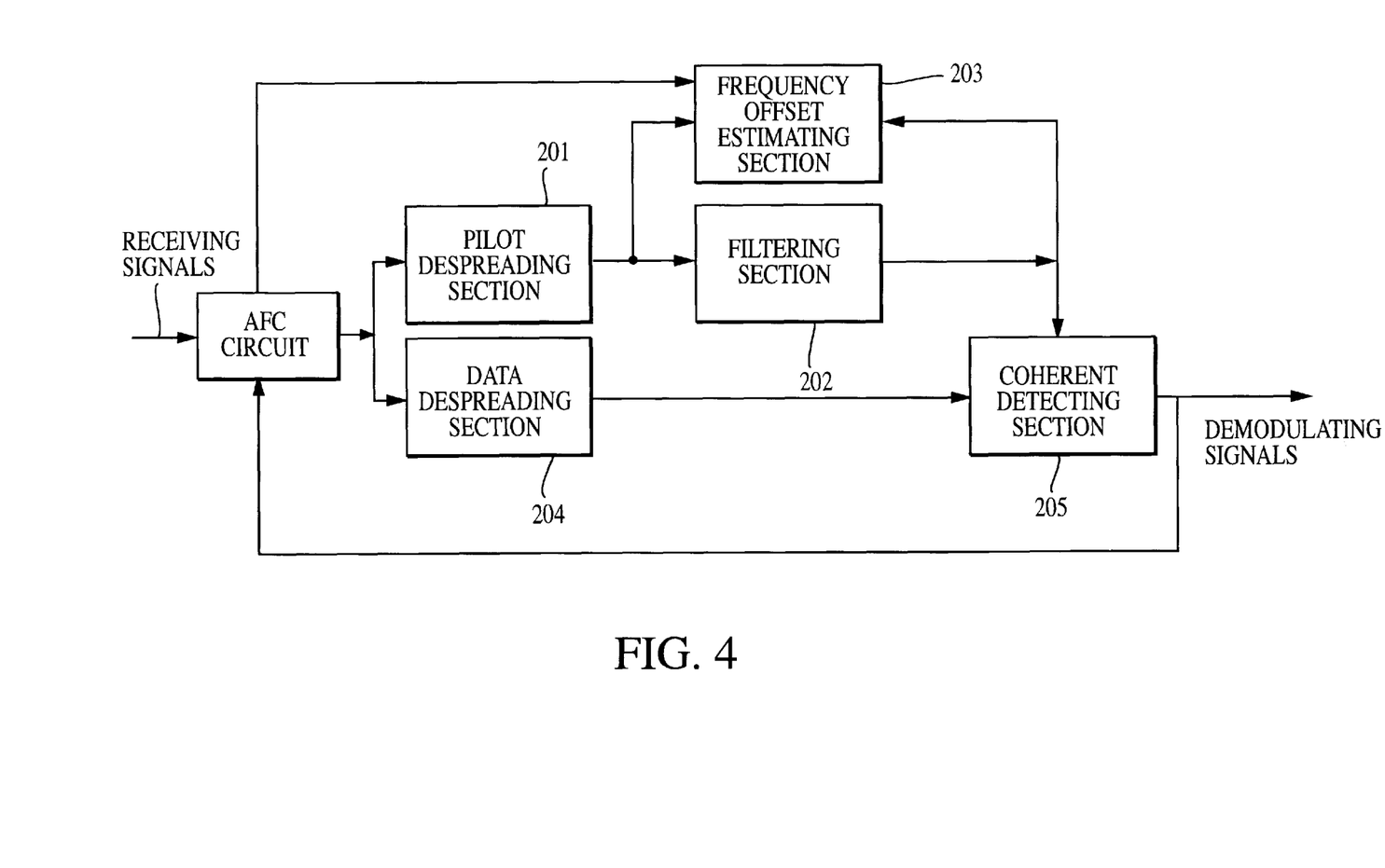
FIG. 4 is a block diagram showing a construction of a wireless communication apparatus according to a second embodiment of the invention.

FIG. 4 is block diagram showing a construction of a wireless communication apparatus according to the second embodiment of the invention.

In a wireless communication apparatus shown in FIG. 4, pilot despreading section 201 despreads received signals using spread codes for pilot channel and detects despread pilot signals. Filtering section 202 decreases interference by causing the despread pilot signals to pass therethrough as described later. Frequency offset estimation section 203 estimates the amount of carrier frequency offset which can be employed by the despread pilot signals, and determines the time constant of the filtering section 202.

Data despreading section 204 despreads the received signals using spread codes for data channel and detects despread data signals. Coherent detecting section 205 corrects the phase shift of the despread data signals using pilot signals passed through the filtering section 202.

Signals received by the wireless communication apparatus constructed as described above are despread by the pilot despreading section 201 with spread codes for pilot channel to detect despread pilot signals, and the same signals are despread by the data despreading section 104 with spread codes for data channel to detect despread data signals.

And the despread pilot signals are caused to pass through the filtering section 202 constituted on the time constant estimated by the frequency offset estimation section 203, wherein the interference are decreased.

The phase shift of the despread data signals is corrected by the coherent detecting section 205 on the basis of the pilot signals passed through the filtering section 202.

Next, a description is given of the filtering of pilot signals in the second embodiment. The pilot signals are fluctuated by frequency shift resulting from a carrier frequency offset of the local oscillator at the receiving side and fading. Where it is assumed that the amplitude of pilot signal is $A_0(t)$, phase is $\phi(t)$, interference to be added are $n_0^I(t)$, $n_0^Q(t)$, the received pilot signals are expressed by the following formula 7.

$$I_0((t)=A_0(t)\cdot\cos\phi(t)+n_0^I(t)$$
$$Q_0(t)=A_0(t)\cdot\sin\phi(t)+n_0^Q(t) \qquad \text{Formula 7}$$

The frequency offset estimation section 203 estimates the amount of a carrier frequency offset which can be employed by the pilot signals, and determines the width (or the time constant) of a passing area of the filtering section 202.

There is a method of using information outputted by an automatic frequency controlling circuit (AFC circuit) as a method of estimating the amount of carrier frequency offset which can be employed by pilot signals. The AFC circuit aims at leading the carrier frequency offset in a designated frequency range, and this is widely used, without being limited to a spread spectrum multiple access system.

By inputting information that the carrier frequency offset is led from the AFC circuit in a designated frequency range, the frequency offset estimating section 203 is able to determine the width (or time constant) of the passing area in the filtering part 202.

Furthermore, the frequency offset estimation section 203is able to predict the carrier frequency offset by counting the number of Zero-Crossing per section time with respect to the time change of pilot signals.

Thus, the time constant is determined in compliance with the amount of carrier frequency offset estimated, a filter is constituted on the basis of the time constant, and despread pilot signals are caused to pass through the filter to decrease the interference, wherein it is possible to prevent the demodulation signals from being deteriorated after the pilot coherent detection, and to attempt to improve the receiving quality after the pilot coherent detection.

(Embodiment 3)

The third embodiment is an embodiment in which the amplitude, frequency and phase of pilot signals are estimated, using the despread output of the received pilot signals, and the estimated amplitude, frequency and sine wave of the phase are generated to decrease the interference.

Figure 5:
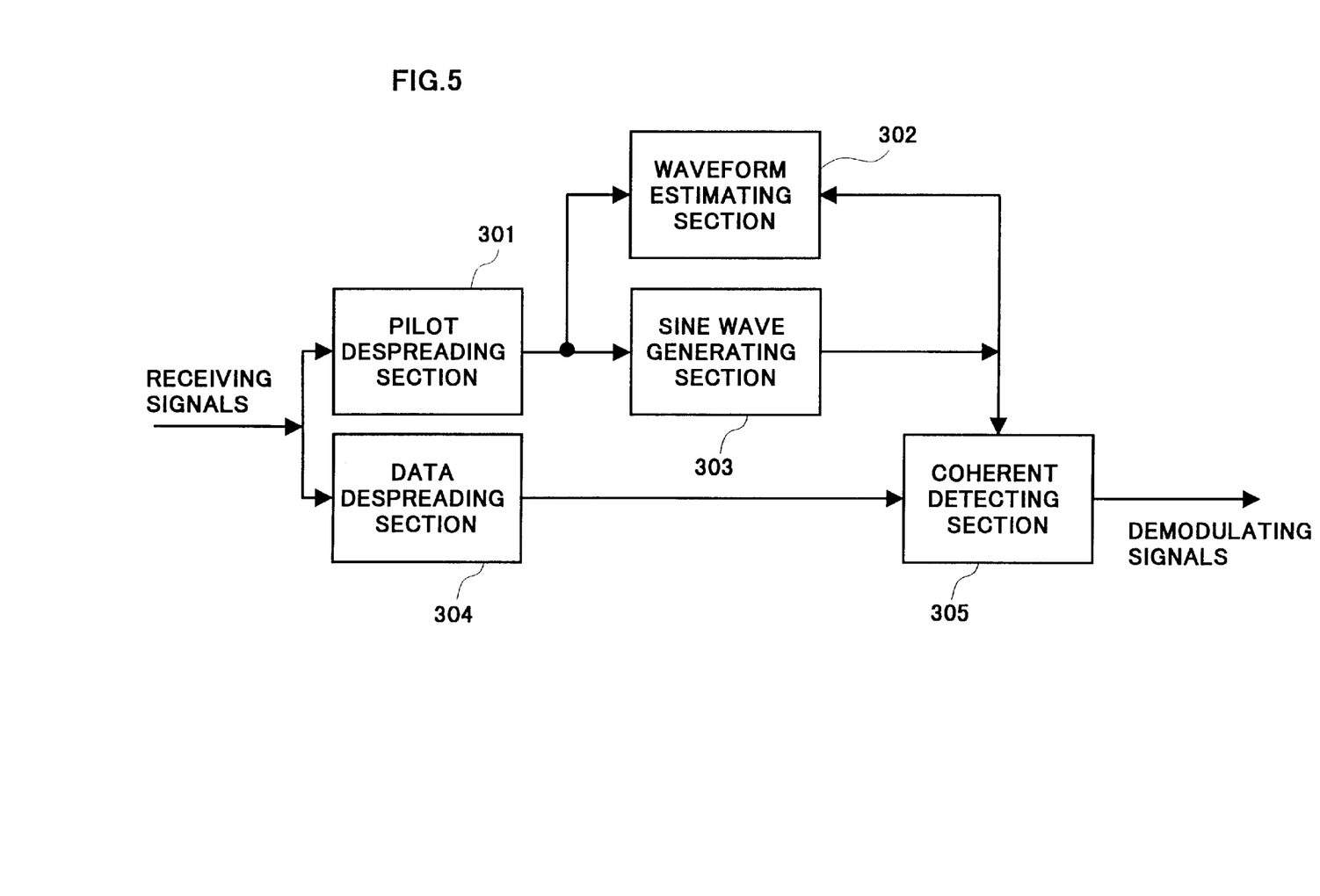
FIG. 5 is a block diagram showing a construction of a wireless communication apparatus according to a third embodiment of the invention.

FIG. 5 is a block diagram showing a construction of a wireless communication apparatus according to the third embodiment of the invention.

In the wireless communication system of FIG. 5, pilot despreading section 301despreads receiving signals, using spread codes for pilot channel, and detects despread pilot signals. As described later, waveform estimation section 302 observes the amplitude and phase of despread pilot signals and estimates the amplitude, frequency and phase before interference are caused to add. Sine wave generating section 303 generates sine wave pilot signals (hereinafter called "estimated pilot signals") having the estimated amplitude, frequency and phase.

Data despreading section 304 despreads receiving signals, using spread codes for data channel and detects despread data signals. Coherent detecting section 305 corrects the phase shift of despread data signals, using the estimated pilot signals.

Signals received by the wireless communication apparatus constructed as described above are despread by the pilot despreading section 301 with spread codes for pilot channel to detect despread pilot signals, and the same signals are despread by the data despreading section 304 with spread codes for data channel to detect despread data signals.

Waveform estimation section 302 estimates the amplitude, frequency and phase of pilot signals before interference are caused to add. On the basis of the result of estimation, estimation pilot signals are generated by the sine wave generating section 303.

Furthermore, data signals are despread by data despreading section 304 with spread codes for data channel, and the phase shift of data signals is corrected on the basis of the estimated pilot signals.

Next, a description is given of the generation of sine waves in the third embodiment. To simplify, it is assumed that pilot signals are fluctuated like sine waves, wherein the amplitude is $A_0$, frequency is $f_0$ and phase is $\phi$. Then, the pilot signals are expressed by the following formula 8.

$$I_0(t) = A_0 \cdot \cos(2\pi f_0 t + \phi) + n_0'(t)$$
$$Q_{0(t)} = A_0 \cdot \sin(2\pi f_0 t + \phi) + n_0^Q(t) \quad \text{Formula 8}$$

As a method of estimating the amplitude, frequency, and phase, there is a method of obtaining the amplitude, frequency, and phase by averaging pilot signals, for example, to such a degree that no amplitude and phase change. If it is assumed that the interference are decreased by averaging, the amplitude can be obtained by the calculation of the following formula 9.

$$\sqrt{I_0^2(t) + Q_0^2(t)} = \sqrt{A_0^2 \cdot \cos(2\pi f_0 t + \phi) + A_0^2 \cdot \sin(2\pi f_0 t + \phi)} = A_0^2 \quad \text{Formula 9}$$

Furthermore, the frequency and phase can be obtained by 10 the time differential value and instantaneous value of the following formula 10.

$$\tan^{-1}\left(\frac{Q_0(t)}{I_0(t)}\right) = 2\pi f_0 t + \phi \quad \text{Formula 10}$$

Furthermore, using system estimation and identification algorithm which are generally employed, it is possible to predict the amplitude, frequency and phase. Furthermore, using an adaptive algorithm to correspond to the amount of frequency offset changing from time to time, it is possible to sequentially predict the amplitude, frequency and phase.

Sine wave generating section 303 generates estimation pilot signals expressed with sine waves of the amplitude, frequency and phase estimated by the wave form estimation section 302.

Furthermore, in the third embodiment, although a description was given of a case where a sine wave is generated by one combination of the amplitude, frequency and phase, it is possible to generate a plurality of sine waves by estimating a plurality of combinations of amplitudes, frequencies, and phases.

Thus, by estimating the amplitude, frequency and phase of pilot signals before interference are caused to add and carrying out pilot coherent detection, it is possible to prevent the demodulation signals from being deteriorated after the pilot coherent detection is finished, and to attempt to improve the receiving quality after the pilot coherent detection.

(Embodiment 4)

The fourth embodiment is an embodiment in which a filter is constituted by estimating the Doppler shift amount of each multiple wave of the despread pilot signals, and only the frequency components of the estimated Doppler shift of the despread pilot signals are caused to pass through a filter in order to decrease the interference.

Figure 6:
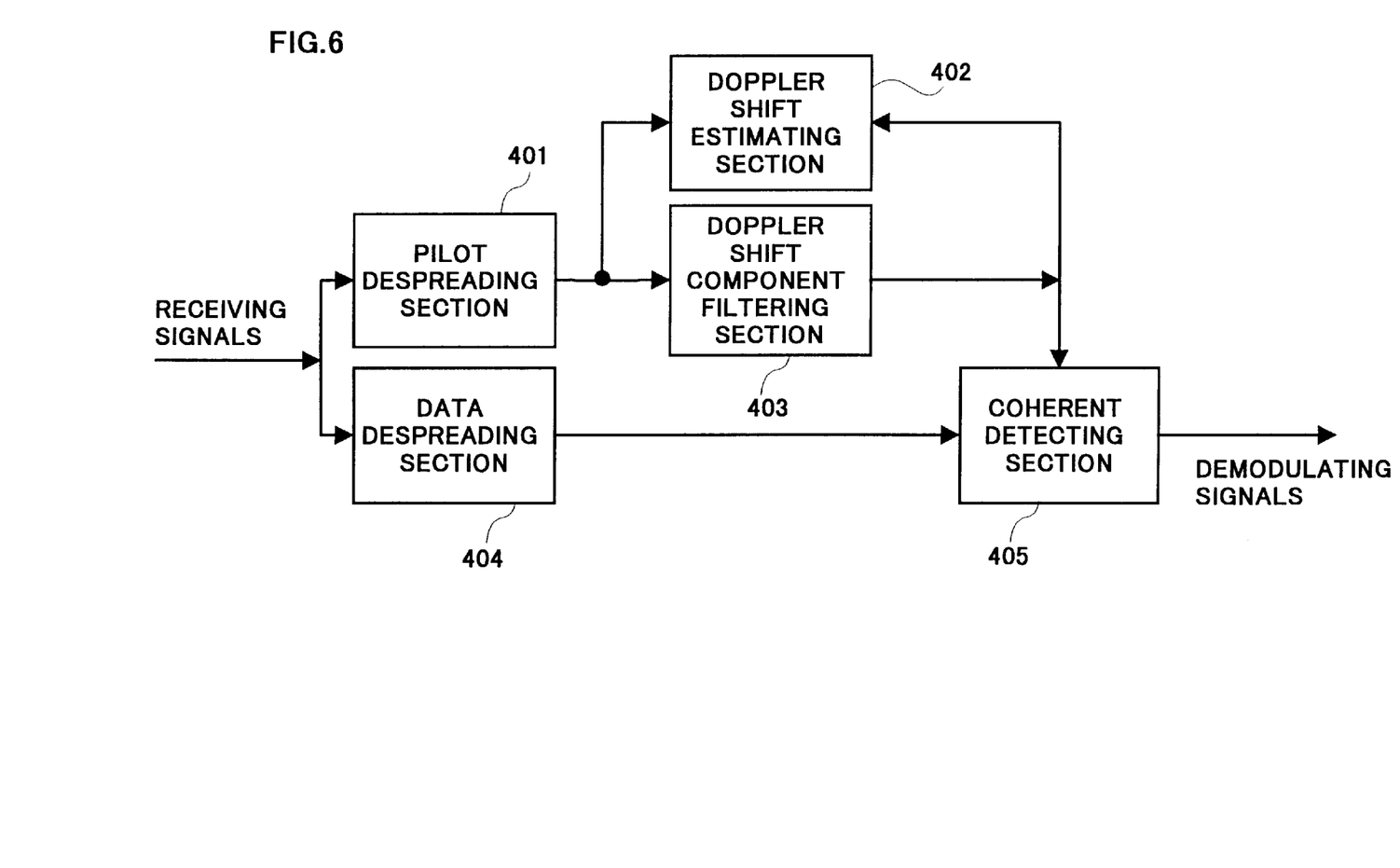
FIG. 6 is a block diagram showing a construction of a wireless communication apparatus according to a fourth embodiment of the invention.

FIG. 6 is a block diagram showing a construction of a wireless communication apparatus according to the fourth embodiment of the invention.

In the wireless communication apparatus of FIG. 6, pilot despreading section 401 despreads receiving signals, using spread codes for pilot channel and detects despread pilot signals. Doppler shift estimating section 402 estimates, as described later, the Doppler shift amount of each multiple wave from the despread pilot signals. Doppler shift component filtering section 403 allows only a specified frequency area of the despread pilot signals to pass on the basis of the estimation result of the Doppler shift estimating section 402.

Data despreading section 404 despreads receiving signals, using spread codes for data channel and detects despread data signals. Coherent detecting section 405 corrects the phase shift of the despread data signals, using the pilot signals passed through the Doppler shift component filtering section 403.

Signals received by the wireless communication apparatus constructed as described above are despread by the pilot despreading section 401 with spread codes for pilot channel and despread pilot signals are detected, and the same signals are despread by the data despreading section 404 with spread codes for data channel, and the despread data signals are detected.

The despread pilot signals are caused to pass through the Doppler shift component filtering section 403 constituted on the basis of Doppler shift amount estimated by the Doppler shift estimating section 402, and the pilot signals of only the frequency area before interference are caused to add is detected.

The phase shift of the despread data signals is corrected by the coherent detecting section 405 on the basis of pilot signals passed through the Doppler shift component filtering section 403.

Next, a description is given of the estimation of the Doppler shift amount in the fourth embodiment 4. The pilot signals are fluctuating by frequency shift due to the carrier frequency offset of a local oscillator at the receiving side and fading. Where it is assumed that the amplitude of pilot signals is $A_0(t)$, the phase thereof is $\phi(t)$, and the interference to add are $n_0'(t)$, $n_0^Q(t)$, the received pilot signals are expressed by the following formula 11.

$$I_0(t) = A_0(t) \cdot \cos \phi(t) + n_0'(t)$$
$$Q_0(t) = A_0(t) \cdot \sin \phi(t) + n_0^Q(t) \quad \text{Formula 11}$$

The amplitude $A_0(t)$ and phase $\phi(t)$ fluctuate due to the frequency shift resulting from the carrier frequency offset of a local oscillator at the receiving side and fading. Doppler shift estimating section 402 estimates the Doppler shift amount corresponding to each multiple wave on the basis of spectra of these pilot signals.

As a method for obtaining the spectra, for example, it is possible to secure spectra of the respective frequency bands by observing the level of output signals of a plurality of band pass filters (BPF) provided so that only a specified frequency band is allowed to pass. Furthermore, pilot signals are Fourier-transformed to secure spectra.

The passing area of Doppler shift component filtering section 403 is determined on the basis of spectra of the pilot signals obtained. The passing area determined covers all the frequency areas where pilot signals exist.

As a method for constituting the Doppler shift component filtering section 403, there is a method in which a plurality of band pass filters (BPF) which allow only a specified frequency band of the spectra secured by the Doppler shift estimating section 402 to pass are combined, where it is judged that pilot signals exist.

Thus, by constituting such a filter where only the frequency area of pilot signals before interference signals are caused to add are allowed to pass, causing despread pilot signals to pass through the filter and decreasing the interference, it is possible to prevent the demodulation signals from being deteriorated after the pilot coherent detection is finished, and to attempt to improve the receiving quality after the pilot coherent detection is finished.

(Embodiment 5)

The fifth embodiment is an embodiment in which the receiving quality of despread pilot signals is measured, a time constant is selected so that the receiving quality is made optimal, a filter is constituted on the basis of the selected time constant, and the interference are decreased by causing the despread pilot signals to pass through the filter.

Figure 7:
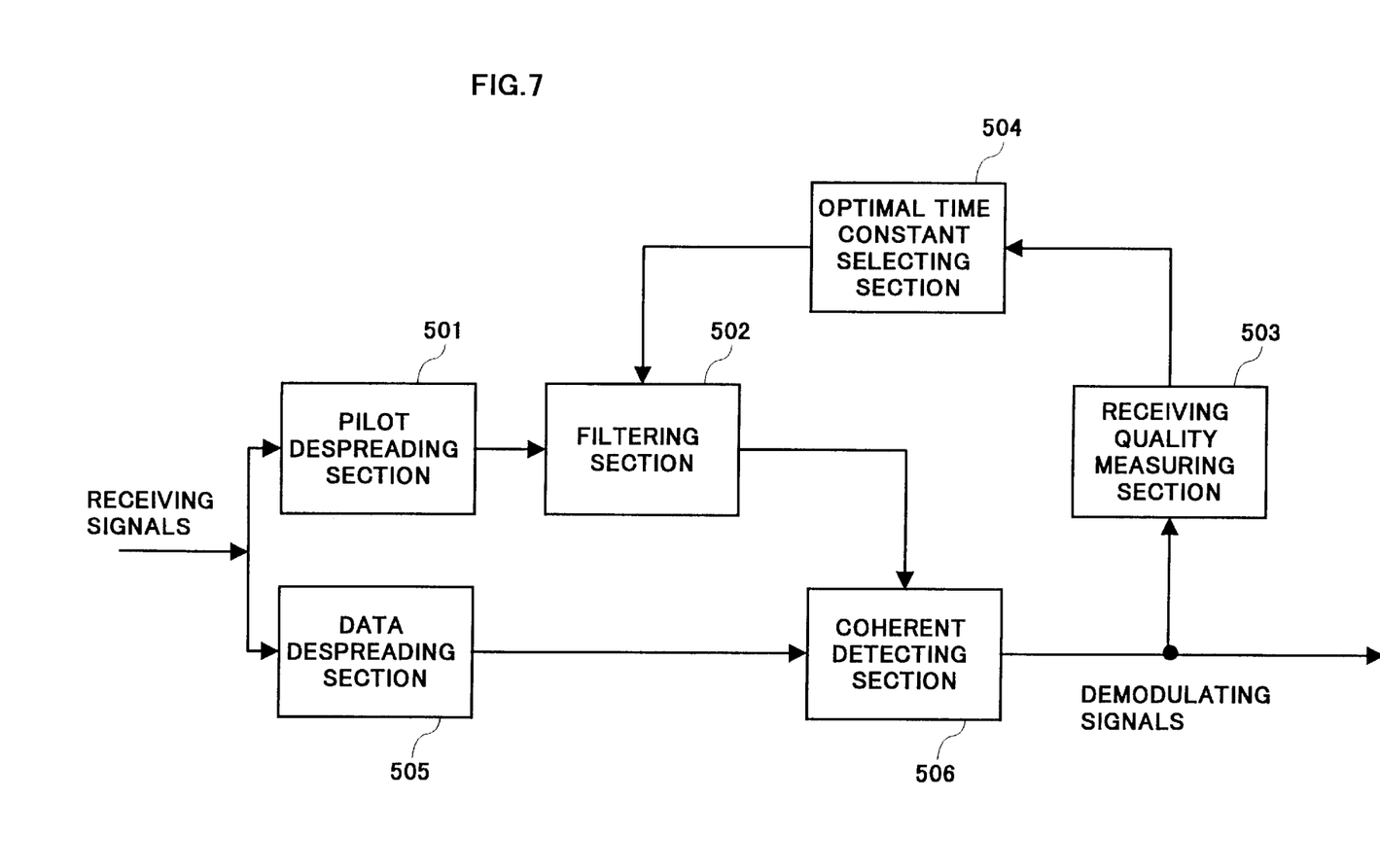
FIG. 7 is a block diagram showing a construction of a wireless communication apparatus according to a fifth embodiment of the invention.

FIG. 7 is a block diagram showing a construction of a wireless communication apparatus according to the fifth embodiment of the invention.

In the wireless communication apparatus of FIG. 7, pilot despreading section 501 despreads receiving signals, using spread codes for pilot channel, and detects despread pilot signals. Filtering section 502 decreases the interference by causing the despread pilot signals to pass therethrough. Receiving quality measuring section 503 measures the receiving quality. Optimal time constant selecting section 504 selects a time constant of the filtering section 502 on the basis of the result of measurement of the receiving quality measuring section 503, so that the receiving quality is made optimal. The receiving quality in the fifth embodiment is obtained by an error ratio of symbols after coherent detection, a bit error ratio after the errors are corrected, or a frame error ratio, etc.

Data despreading section 505 despreads the receiving signals, using spread codes for data channel, and detects despread data signals. Coherent detecting section 506 corrects the phase shift of the despread data signals on the basis of pilot signals passed through the filtering section 502.

Signals received by a wireless communication apparatus constructed as described above are despread by the pilot despreading section 501 with despread codes for pilot channel to detect despread pilot signals, and the same signals are despread by the data despreading section 505 with spread code for data channels to detect the despread data signals.

The despread pilot signals pass through the filtering section 502 constituted on the basis of the time constant selected by the optimal time constant selecting section 504 so that the receiving quality is made optimal, and the interference are decreased.

The phase shift of despread data signals is corrected on the basis of pilot signals passed through the filtering section 502 by coherent detecting section 506.

Thus, by establishing a time constant of filtering with respect to the pilot signals so that the receiving quality after the coherent detection is made optimal, it is possible to further improve the receiving quality than a case where the time constant of filtering is fixed.

Furthermore, a wireless communication apparatus according to each of the respective embodiments of the invention can be equipped in base station equipment or mobile station equipment in a mobile communications system. Therefore, it is possible to receive data without being damaged, in data transmission of a mobile communications system.

As been made clear in the above description, demodulation signals after the pilot coherent detection can be prevented from being deteriorated, by decreasing the interference added on the despread pilot signals, and it is therefore possible to provide a wireless communication apparatus and a wireless communication method which are able to attempt to improve the receiving quality.

What is claimed is:

1. A wireless communication apparatus, comprising:
   a pilot despreader that despreads received signals using spread codes for a pilot channel and detects despread pilot signals;
   a frequency offset estimator that determines a time constant by estimating a frequency offset amount employed by pilot signals before an interference due to fading is added;
   a filter that reduces said interference added to said pilot signals in accordance with said time constant;
   a data despreader that despreads the received signals using spread codes for a data channel and detects despread data signals; and
   a coherent detector that coherently detects the despread data signals using said pilot signals having said reduced interference.

2. A base station apparatus associated with a wireless communication apparatus for performing radio communications, said wireless communication apparatus comprising:
   a pilot despreader that despreads received signals using spread codes for a pilot channel and detects despread pilot signals;
   a frequency offset estimator that determines a time constant by estimating a carrier frequency offset amount employed by pilot signals before an interference due to fading is added;
   a filter that reduces said interference added to said pilot signals in accordance with said time constant;
   a data despreader that despreads the received signals using spread codes for data channel and detects despread data signals; and
   a coherent detector that coherently detects said despread data signals using said pilot signals having said reduced interference.

3. A mobile station apparatus associated with a wireless communication apparatus for performing radio communications, said wireless communication apparatus comprising:
   a pilot despreader that despreads received signals using spread codes for a pilot channel and detects despread pilot signals;
   a frequency offset estimator that determines a time constant by estimating a carrier frequency offset amount employed by pilot signals before an interference due to fading is added;
   a filter that reduces said interference added to said pilot signals in accordance with said time constant;
   a data despreader that despreads the received signals using spread codes for a data channel and detects despread data signals; and
   a coherent detector that coherently detects the despread data signals using said pilot signals having said reduced interference.

4. A wireless communication apparatus, comprising:
a frequency offset estimator that determines a time constant by estimating a carrier frequency offset amount employed by pilot signals before an interference due to fading is added, by using information outputted from an automatic frequency controlling circuit;
a filter that reduces said interference added to said pilot signals in accordance with said time constant;
a despreader that despreads the received signals using spread codes and detects despread data signals; and
a coherent detector that coherently detects the despread signals using said pilot signals having said reduced interference.

5. A wireless communication apparatus, comprising:
a pilot despreader that despreads received signals using spread codes for a pilot channel and detects despread pilot signals;
a frequency offset estimator that determines a time constant, using information output from an automatic frequency controlling circuit, by estimating a carrier frequency offset amount employed by said despread pilot signals before an interference due to fading is added;
a filter that reduces said interference added to said despread pilot signals in accordance with said time constant;
a data despreader that despreads the received signals using spread codes for a data channel and detects despread data signals; and
a coherent detector that coherently detects said despread data signals using said despread pilot signals having said reduced interference.

* * * * *

UNITED STATES PATENT AND TRADEMARK OFFICE
CERTIFICATE OF CORRECTION

PATENT NO. : 6,219,391 B1
DATED : April 17, 2001
INVENTOR(S) : T. Nakano

Page 1 of 1

It is certified that error appears in the above-identified patent and that said Letters Patent is hereby corrected as shown below:

<u>Column 11, claim 4,</u>
Line 11, after "despread" insert -- data --.

Signed and Sealed this

Nineteenth Day of February, 2002

Attest:

JAMES E. ROGAN
Attesting Officer     *Director of the United States Patent and Trademark Office*